United States Patent Office 2,809,667
Patented Oct. 15, 1957

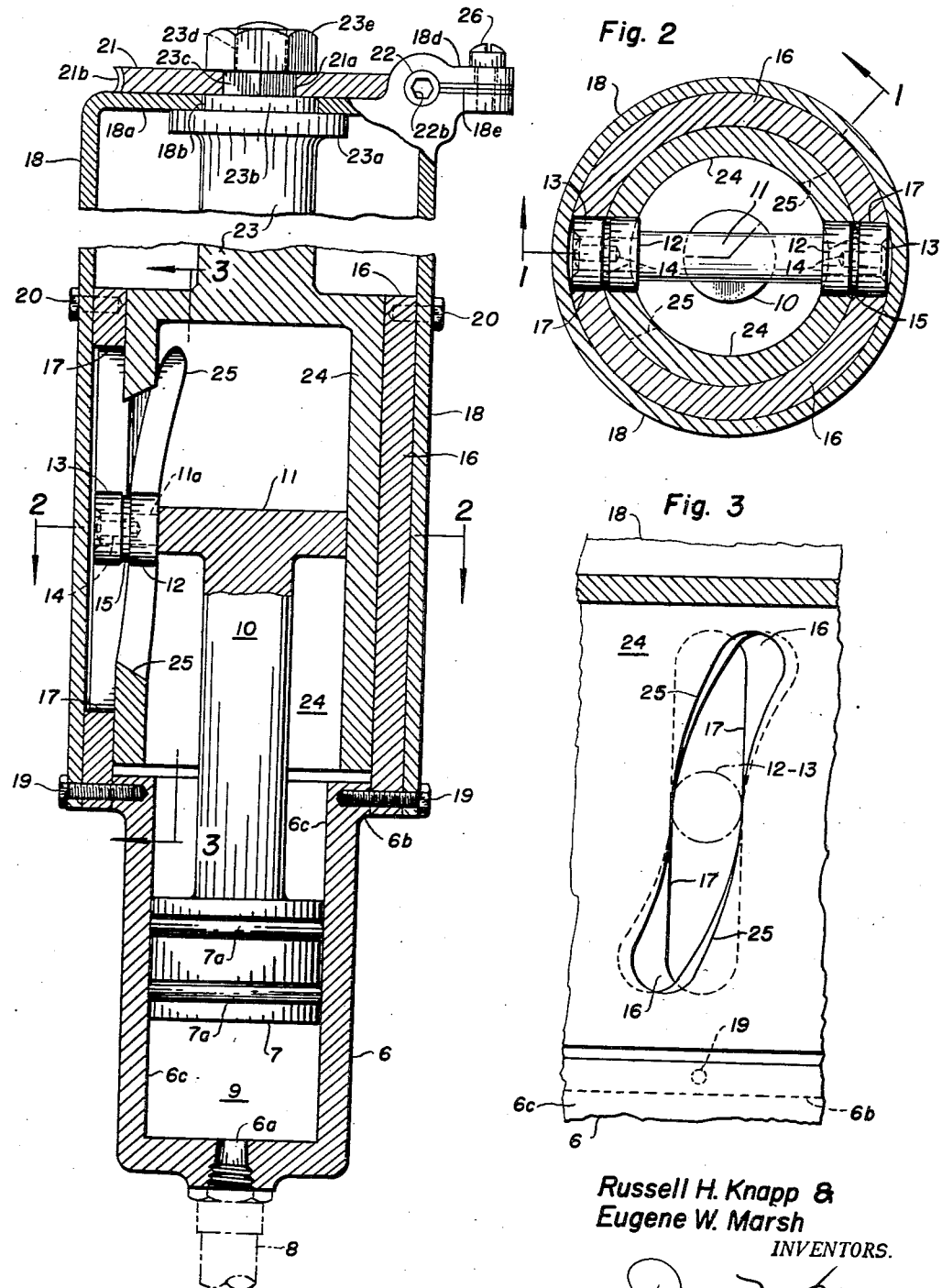

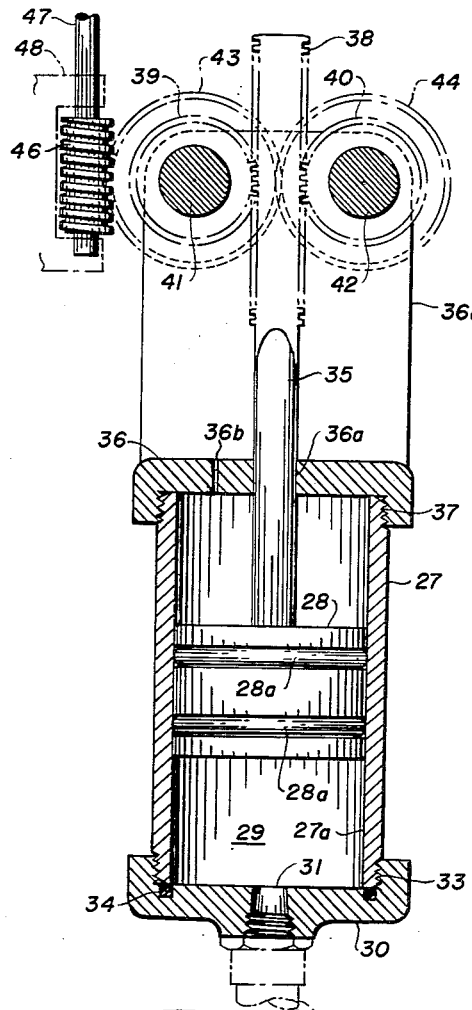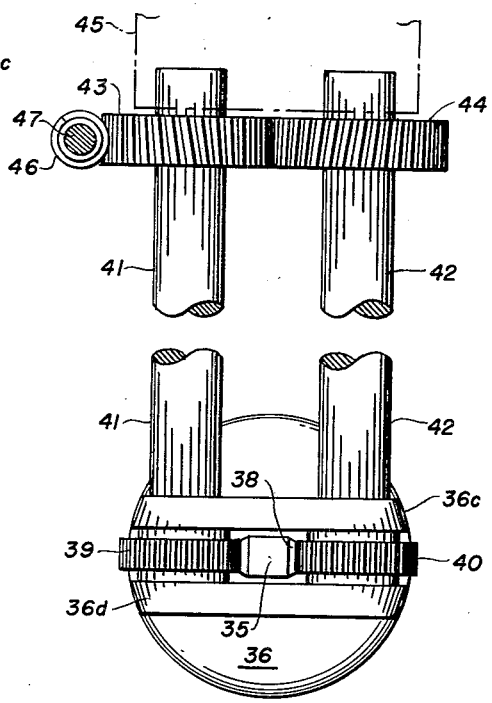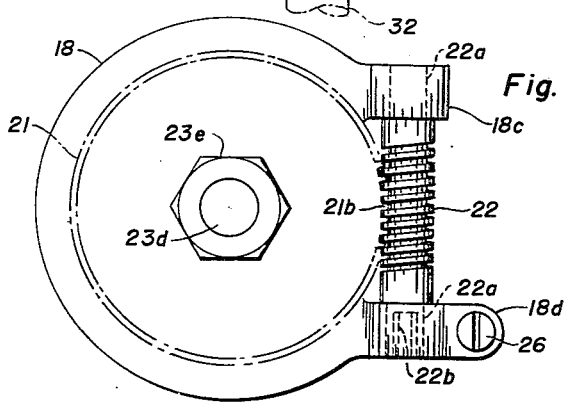

2,809,667

HYDRAULIC ACCUMULATOR

Russell H. Knapp and Eugene W. Marsh, Seattle, Wash., assignors to Boeing Airplane Company, a corporation of Delaware Application May 18, 1955, Serial No. 509,256

3 Claims. (Cl. 138—31)

The present invention relates to the storage of energy in hydraulic systems and more particularly to accumulators and other pressure compensating devices having components of the torsion type.

Accumulators are commonly used in hydraulic systems and are frequently quite large and space-consuming, and usually add appreciable weight to the system. Most of the accumulators of the types presently in general use do not lend themselves readily to pre-loading or adjustment to higher pressures and in certain existing installations if the stored energy were released accidently it would be likely to result in an accident or damage of serious proportions, particularly in aircraft hydraulic systems.

These disadvantages and objections have been overcome for the most part by the improved torsion bar type hydraulic accumulator forming the subject matter of the present application. In a preferred form of the present invention, a piston type accumulator utilizes torsion bar or like means for storing energy. In one form of the improved device, the piston rod is provided with a cross-shaft on which are rotatably mounted rollers which ride in helical guide slots in a rotating cylinder attached to a torsion rod and in axial guide slots in a fixed cylinder attached to a torque tube; and the torque tube is in turn attached to the torsion rod at an opposite end thereof whereby hydraulic pressure acting against the accumulator piston causes the latter to move axially and to rotate the torsion rod with respect to the torque tube. In another form of the device the accumulator is comprised of a simple piston and cylinder with the piston rod in the form of a rack engaging one or more pinions and converting axial piston movement to torsional rotation of one or more torsion rods or shafts. In each of the described embodiments, the torsion bar or rod is readily pre-loaded or pre-stressed either by worm and worm wheel adjusting mechanism shown and described below, or by other suitable means adapted for manual adjustment by ordinary hand tools.

It is, accordingly, a primary objective of the present invention to provide an improved type hydraulic accumulator in which the forces developed within a cylinder upon a piston are transmitted and stored within a torsion bar or rod. It is a further object to provide such a device which is simple, compact, light in weight and foolproof and simple in its operation. A corollary objective is the provision of such accumulator devices which are adapted for pre-loading by relatively simple adjusting mechanisms and which are not likely to cause serious damage in the event of the accidental release of the stored energy. Other objects and advantages of the present invention reside in the novel general arrangement of the respective components for converting the linear movement of the piston into the rotation of the respective torsion rod as well as in the details of the respective parts.

These and other advantages and objects will become apparent to those skilled in the art following a reading of the present description taken in conjunction with the accompanying drawings, forming a part hereof, in which:

Fig. 1 shows a cross-sectional view of a preferred form of hydraulic piston-cylinder type accumulator having a helical guide slot conversion mechanism and a pre-loadable torsion rod;

Fig. 2 is a cross-sectional view of the accumulator device of Fig. 1 as taken along the lines 2—2 thereof;

Fig. 3 is a sectional elevational view of the helical guide slot conversion mechanism as taken along the lines 3—3 of Fig. 1;

Fig. 4 is an end view of the pre-loading mechanism shown at the top of Fig. 1;

Fig. 5 shows a longitudinal sectional view of a modified form of hydraulic accumulator device utilizing a rack and pinion conversion mechanism for storing energy within a pair of parallel torsion rods; and Fig. 6 is an end view of the rack and pinion conversion mechanism as well as the mechanism for pre-loading the parallel torsion rods shown in Fig. 5.

Referring now to Fig. 1, the numeral 6 indicates a high pressure cylinder having a closed end or head in which is provided the opening or port 6a. The cylinder 6 carries at its opposite open end an outwardly facing boss portion 6b extending around the periphery of the cylinder and is provided throughout its length with an internal bore 6c. There is reciprocably mounted within this bore 6c of the cylinder 6 a piston 7 provided with a plurality of pressure-tight seals 7a. The port 6a at the otherwise closed end of the cylinder 6 has connected thereto the fluid conduit 8 through which the fluid under pressure is admitted to or discharged from the working chamber 9 within the bore 6b of the cylinder between the piston 7 and the closed end thereof. The piston 7 has integrally formed thereon, or is attached to, the piston rod 10 which preferably also has integrally formed thereon the cross-shaft portion 11. A pair of rollers 12 and 13 is rotatably attached to each of the oppositely extending reduced end portions 11a of the cross-shaft 11, being retained thereon by the roller retaining screws 14. Between each inner roller 12 and the adjacent outer roller 13, there is preferably disposed a spacer 15.

A hollow tubular outer guide cylinder 16 is coaxially mounted upon the annular boss or shoulder 6b of the cylinder element 6 and straight guides 17 having rounded end portions are cut through the walls of the guide cylinder 16 at diametrically opposed portions to receive the outer rollers 13. The guide cylinder 16 is concentrically enclosed within the tubular torque tube or outer cylindrical shell 18 to which it is attached, as well as to the boss 6b of the hydraulic cylinder 6, by means of the attachment screws 19 at one end, and the guide cylinder 16 and the torque cylinder 18 are attached to each at the opposite end of the guide cylinder 16 by means of the similar attachment screws 20.

The torque tube or outer cylinder shell 18 is also an open ended or cup-shaped cylinder having its outer end 18a disposed opposite to the ported end 6a of the pressure cylinder 6. This outer end 18a of the shell 18 is centrally apertured at 18b to provide a bearing for the torsion rod 23 and has adjacently mounted thereon the pre-loading mechanism 21—22 which will be described below in greater detail. Returning now to the guide cylinder 16, there is rotatively mounted coaxially therein the inner rotating guide cylinder 24 which is provided with a pair of opposed helical slots 25 within which the inner pair of rollers 12 is adapted to be guidingly moved. The inner rotating cylinder 24 has an open end terminating closely adjacent the open end of the pressure cylinder 6, and its opposite end is closed and has integrally formed thereon, or otherwise attached thereto, the torsion rod 23. The latter is preferably of a suitable length, dependent upon the magnitude of the energy to be absorbed and stored by the fluid forces acting upon the piston 7, and has formed on its outer end the flange 23a adapted to bear against the inner face of the end 18a of the outer cylinder or torque tube 18. Adjacent its flange 23a the torsion rod 23 is provided with a cylindrical portion 23b adapted to be rotatively journalled within the bearing 18b, and externally thereof it is provided with a squared portion 23c (which might alternatively be serrated or splined) for positive rotation with the worm wheel 21 by engagement with its squared opening 21a externally of which the torque rod is threaded as at 23d to receive the retaining nut 23e.

As shown in Figs. 1 and 4, the end portion 18a of the outer shell 18 is provided with apertured boss or shouldered portions 18c and 18d the apertures for which form the bearings for the stepped down ends 22a of the worm 22. The worm wheel 21 is provided with a plurality of teeth 21b which mesh with those of the worm 22 such that when an Allen head type wrench is inserted within the hexagonal opening 22b and the worm 22 rotated, the worm wheel 21 and the attached torsion rod 23 are also rotated in the corresponding direction. In this manner, the torsion bar 23 can be pre-loaded and the boss or lug 18d is suitably slotted as at 18e with a tightening screw in the form of a lock bolt 26, which by drawing the halves of the slotted lug 18d together, clamps the end portion 22a of the worm 22 to secure the same in the adjusted position.

Referring again to Fig. 1, it will be seen that the fluid pressure within the system and within the high pressure chamber 9 is exerted against the piston 7 which tends to move upwardly in this figure. Due to the cross-shaft and roller assembly 11—15, the upward movement of the piston assembly is confined by the outer rollers 13, to not only a rectilinear path, but also one which is non-rotational. This confined movement of the piston assembly is dictated by the outer rollers 13 being guided along the straight guide slots 17 in the outer or fixed guide cylinder 16. The inner cylinder 24, integral with the torsion rod 23 is, however, rotatable within the guide cylinder 16 and has formed in its opposed wall portion the helical guide slots 25. Accordingly, as the piston assembly, together with the rollers 12 and 13, moves upwardly in Fig. 1, the inner cylinder 24 is caused to rotate, in the counterclockwise direction as viewed in Fig. 2, due to the curvature of the slots 25; and a corresponding torsional force is applied to the torsion rod 23 inasmuch as its terminal at 23c is fixed or locked to the end 18a of the outer casing 18 by means of the locked pre-loading assembly 21—22.

As shown in Fig. 1, the rollers are centrally disposed within the length of the slots 17 and 25 and all of the components in the accumulator assembly are in their neutral unloaded positions in this figure. In the event it is desired to pre-load the accumulator prior to the application of fluid pressure to the working face of the piston 7, the worm 22 is rotated in the counterclockwise direction by means of a suitable Allen head wrench engaged in the slot 22b with the screw 26 in its released position to thereby impart clockwise rotation to the worm wheel 21 as viewed in Fig. 4. Through the medium of the torsion rod 23 the inner rotating cylinder 24, as viewed in Fig. 2, is also caused to move in the clockwise direction and the component of this movement as exerted by the guide slots 25 imparts a downwardly resulting movement to the rollers 12 which is transmitted through the torque shaft 11 and the piston rod 10 to move the piston 7 downwardly, as viewed in Fig. 1, into the working chamber 9 toward the inlet port 6a. The force required to be applied through the pre-loading mechanism 21—22 to accomplish such downward movement of the piston assembly 7 develops a corresponding torsional force in the torsion rod 23 and when the locking screw 26 is again tightened the torsion rod 23 has been pre-loaded to a predetermined magnitude.

When the fluid pressure is again permitted to enter the working chamber 9, and is exerted against the working face of the piston 7, the rollers 12 and 13 which had been moved downwardly due to the pre-loading force and the curvature of the guide slots 25, is now forced upwardly under the influence of the piston and the resulting camming effect upon the guide slots 25 creates additional torsion within the torque rod 23 in direct relation to the force exerted upon the piston face by the pressure of the fluid in the chamber 9. As long as the loading worm and worm wheel 21—22 are locked, the energy remains stored in the torsion rod 23 to be released to any predetermined extent whenever desired.

The improved accumulator device accordingly can be said to be comprised of the following components or mechanisms, namely: (1) the piston 7 which transmits forces to and from the accumulator and the hydraulic fluid; (2) the rollers 12 and 13 and the guides 17 and 25 which convert linear to rotary motion and vice versa; (3) the torsion rod 23 in which the energy is stored, whether created manually in pre-loading the device, or hydraulically from the fluid pressure within the system; (4) the loading and unloading mechanism comprising the worm and worm wheel assembly 21—22; and (5) the locking mechanism including the locking screw 26 for maintaining any predetermined setting of the torsion rod assembly.

Referring now to Figs. 5 and 6, there is shown a modified form of torsion rod accumulator in which the mechanism for converting rectilinear movements of the piston into rotational twisting or torsion is accomplished by a rack and a double pinion arrangement with the energy stored in two parallel torsion rods. In this modification the cylinder is designated by the numeral 27 having an internal bore 27a within which the piston 28 is arranged to slidably reciprocate in a fluid-tight relationship by virtue of the seal means 28a. The cylinder 27 and the working face of the piston 28 define the fluid pressure chamber 29 in conjunction with the cylinder head 30 having a port 31 through which fluid is transmitted to or from the chamber 29 in conjunction with the conduit 32. The adjacent end of the tubular cylinder or casing element 27 is threaded at 33 where it is engaged by the internal threads of the cylinder head 30 and made pressure tight by means of the annular seal means 34. A piston rod 35 is fixedly attached to the piston 28, and the opposite cylinder head 36, having a pair of integral brackets 36c and 36d, threadedly engages the external threads 37 on the adjacent end of the cylinder 27. The cylinder head 36 is centrally apertured at 36a to permit the piston rod 35 to pass therethrough and a suitable vent opening 36b is provided to ventilate the space between the back of the piston 28 and the cylinder end 36.

The outer end of the piston rod 35 is preferably rectangularly shaped and provided with teeth on its opposite sides or faces to form the toothed rack 38. These racks are threadedly engaged with the adjacent pinions 39 and 40 which are fixed respectively to the parallel torsion rods 41 and 42 suitably journalled in the brackets 36c and 36d of the cylinder end member 36. The torsion rods 41 and 42 are parallel and of sufficient length to store the torsional forces for which they are designed. They are also journalled at their opposite ends in the support structure 45 adjacent to which they have fixed thereto the worm gears 43 and 44. These worm gears or wheels 43 and 44 mesh with each other in such manner that the torsion rods 41 and 42 are twisted or partially rotated in opposite directions only when the worm 46 on the shaft 47 journalled within the supporting structure 48, is rotated. At all other times, the worm 46 serves as a lock for the worm gear 43 which in turn locks the adjacent worm gear 44, such that the adjacent ends of the torsion rods 41 and 42 are anchored and fixed and the torsion is applied by movement of the piston 28 and the double rack 38. It will also be noted that, as in the case of the previous modification, the presently described form of device may also be pre-loaded to any predetermined extent in addition to the torsion developed by the operating pressure.

As a possible aid in visualizing the size and capacity of a piston-cylinder double type torsion rod hydraulic accumulator, of the nature disclosed in Figs. 5 and 6, the following figures might be regarded as typical of a hypothetical installation. In the event the device is equipped with a 4" piston diameter and a 3" stroke for a 1500 p. s. i. system operating pressure and a 750 p. s. i. system pre-load pressure, in the double-rack and pinion arrangement consisting of two torque rods driven by 3" diameter pinion gears 39 and 40, the pertinent figures might be approximately as follows: The working volume of accumulator fluid will be approximately 38 cubic inches and the minimum pre-load force on the piston approximately 9400 pounds; the maximum ultimate force on the system will be approximately 18,800 inch pounds, while the pre-load torque on one rod only (minimum) will be approximately 7050 inch pounds and the maximum ultimate torque on one rod only will be approximately 14,100 inch pounds. The rotation of the shaft for a 3" stroke is equivalent to approximately two radians and the rotation necessary to apply the pre-load will also be in the magnitude of two radians with a total rotation of the torsion rod or shaft of about 4 radians. The diameter of the torsion rod will be approximately .784" at a working stress of 150,000 for a steel bar in torsion. The length of the torsion bar (at a modulus of elasticity for steel of 12,000,000) will be approximately 125" and the volume thereof will be approximately 60 cubic inches.

The foregoing figures are, of course, susceptible of wide changes to suit the needs of a direct application to a specific problem. From the foregoing figures, it can be seen that the selection of assumed values will be reflected in changes to the length and diameter of the torsion rods or shafts. In other words, increasing the diameter of the pinion gear will result in a decrease in the length of the shaft, an increase in the torsion or torque, and an increase in the diameter of the shaft, but would have no appreciable effect on the volume of the metal in the shaft. On the other hand, an increase in the piston diameter of the accumulator will serve to increase the torsion, decrease the length of the torsion rod, or increase the diameter thereof. It will, accordingly, be seen that the values may be chosen which will sufficiently match the requirements of the device for a specific installation. Also that more than two torsion rods may be used which will shorten the overall length without the addition of weight. It will be also apparent that alternate designs can place the rack in tension, rather than in compression as indicated in Figs. 5 and 6, and also that the rack and pinion could be replaced by a suitable crank mechanism to obtain a possible weight saving and manufacturing economy.

Other forms and modifications of the present invention, both with respect to its overall arrangement and the details of its respective parts, which will become apparent to those skilled in the art after reading the present description, are intended to come within the scope and spirit of this invention as more particularly set forth in the appended claims.

We claim:

1. In an accumulator device, the combination comprising, a fixed fluid-constraining cylinder having an opening therein for the admission of fluid, a piston disposed for reciprocal movement within said cylinder in response to the pressure of said fluid, means cooperatively carried by said piston and said cylinder to prevent relative rotation between said cylinder and said piston, a torsion member having one portion disposed for rotary movement and another portion adapted to be constrained against said rotary movement, means cooperatively carried by said piston and by said one portion of said torsion member for converting said reciprocal movement of said piston into rotary movement of said one portion of said torsion member, and means cooperating with said another portion of said torsion member for constraining said another portion of said torsion member against rotary movement and for preloading said torsion member against the pressure of said fluid.

2. In an accumulator device, the combination comprising, a fixed fluid-constraining cylinder having an opening therein for the admission of fluid, a piston disposed for reciprocal movement within said fluid-constraining cylinder in response to the pressure of said fluid, a follower member carried by said piston for reciprocal movement therewith, a fixed guide cylinder having a slot therein adapted to receive said follower member and thus prevent relative rotation between said piston and said fluid-constraining cylinder, a torsion member having one portion disposed for rotary movement and another portion adapted to be constrained against said rotary movement, camming means carried by said one portion of said torsion member, another follower member carried by said piston and adapted to cooperate with said camming means to convert said reciprocal movement of said piston into rotary movement of said one portion of said torsion member, and means cooperating with said another portion of said torsion member for constraining said another portion of said torsion member against rotary movement and for preloading said torsion member against the pressure of said fluid.

3. In an accumulator device, the combination comprising, a fixed fluid-constraining cylinder having an opening therein for the admission of fluid, a piston disposed for reciprocal movement within said cylinder in response to the pressure of said fluid, a follower member carried by said piston for reciprocal movement therewith, a fixed guide cylinder having a slot therein adapted to receive said follower member and thus prevent relative rotation between said piston and said fluid-constraining cylinder, a torsion member having one portion disposed for rotary movement and another portion adapted to be constrained against said rotary movement, camming means carried by said one portion of said torsion member, another follower member carried by said piston and adapted to cooperate with said camming means to convert said reciprocal movement of said piston into rotary movement of said one portion of said torsion member, and means including a lockable worm and worm wheel which cooperate with said another portion of said torsion member for constraining said another portion of said torsion member against rotary movement and for preloading said torsion member against the pressure of said fluid.

References Cited in the file of this patent

UNITED STATES PATENTS

| | | |
|---|---|---|
| 912,502 | Squires | Feb. 16, 1909 |
| 1,655,623 | Morin | Jan. 10, 1928 |
| 2,591,281 | Musschoot | Apr. 1, 1952 |
| 2,713,484 | Pierce | July 19, 1955 |